(12) United States Patent
Hirate et al.

(10) Patent No.: US 11,312,391 B2
(45) Date of Patent: Apr. 26, 2022

(54) DISPLAY APPARATUS AND DISPLAY CONTROL APPARATUS

(71) Applicant: DENSO CORPORATION, Kariya (JP)

(72) Inventors: Yousuke Hirate, Kariya (JP); Daiji Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 16/850,554

(22) Filed: Apr. 16, 2020

(65) Prior Publication Data

US 2020/0331488 A1  Oct. 22, 2020

(30) Foreign Application Priority Data

Apr. 19, 2019  (JP) .............................. JP2019-079864

(51) Int. Cl.
*B60W 50/14* (2020.01)
*B60W 60/00* (2020.01)
*B60K 35/00* (2006.01)
*G05D 1/00* (2006.01)

(52) U.S. Cl.
CPC ............. *B60W 50/14* (2013.01); *B60K 35/00* (2013.01); *B60W 60/005* (2020.02); *G05D 1/0061* (2013.01); *B60K 2370/175* (2019.05); *B60K 2370/52* (2019.05); *B60W 2050/146* (2013.01); *B60W 2540/18* (2013.01)

(58) Field of Classification Search
None
See application file for complete search history.

(56) References Cited

U.S. PATENT DOCUMENTS

| | | |
|---|---|---|
| 2016/0207537 A1 | 7/2016 | Urano et al. |
| 2018/0065657 A1 | 3/2018 | Hirate et al. |
| 2018/0105184 A1 | 4/2018 | Urano et al. |
| 2019/0118831 A1 | 4/2019 | Mimura et al. |
| 2019/0300013 A1* | 10/2019 | Shiraishi ........... B60W 60/0053 |

FOREIGN PATENT DOCUMENTS

| | | |
|---|---|---|
| JP | 2015-20604 A | 2/2015 |
| JP | 2016-133984 A | 7/2016 |
| JP | 2018-030481 A | 3/2018 |
| JP | 2018-062321 A | 4/2018 |
| WO | 2017/168738 A | 10/2017 |

* cited by examiner

*Primary Examiner* — Abdhesh K Jha
(74) *Attorney, Agent, or Firm* — Maschoff Brennan

(57) ABSTRACT

A display apparatus mounted on a vehicle may comprise: a display device that is placed in a vehicle compartment of a vehicle configured to perform a cooperative driving mode in which a manual operation by a driver and an autonomous operation by an autonomous driving function cooperate with each other to control a driving of the vehicle; an acquisition section that is configured to acquire a degree of restriction applied to an autonomous operation torque controlled by the autonomous driving function in the cooperative driving mode in response to set of the degree of restriction according to a manual operation amount input by the driver; and a display control device that causes the display device to display a cooperative ratio of the manual operation and the autonomous operation in the cooperative driving mode based on the degree of restriction.

8 Claims, 8 Drawing Sheets

FIG. 4

| AD | DRIVING MODE | DISPLAY MODE | DRIVER COOPERATION MODE | INTERVENTION COEFFICIENT | STATE |
|---|---|---|---|---|---|
| OFF | MANUAL DRIVING MODE | | 0 | OPTIONAL | MANUAL DRIVING |
| ON | AUTONOMOUS DRIVING MODE | | 1 | OPTIONAL | AUTONOMOUS DRIVING (WITHOUT DRIVER INTERVENTION) |
| ON | COOPERATIVE DRIVING MODE (DRIVER ACTIVE) | $\alpha=1$ / $\alpha=0.5$ / $\alpha=0$ (AD DEGENERACY) | 2 | $0 < \alpha \leq 1$ | COOPERATIVE STATE WITH DRIVER (DRIVER'S ACTIVE INTERVENTION/ AD DEGENERACY) |
| ON | COOPERATIVE DRIVING MODE (DRIVER PASSIVE) | $\alpha=1$ / $\alpha=0.5$ / $\alpha=0$ (AD RETURN) | 3 | $0 \leq \alpha < 1$ | COOPERATIVE STATE WITH DRIVER (DRIVER INTERVENTION REDUCTION/ AD RETURN) |

DISPLAY APPARATUS AND DISPLAY CONTROL APPARATUS

CROSS REFERENCE TO RELATED APPLICATIONS

This application is based on Japanese Patent Application No. 2019-079864 filed on Apr. 19, 2019, the disclosure of which is incorporated herein by reference.

TECHNICAL FIELD

The present disclosure relates to a display apparatus and a display control apparatus.

BACKGROUND

A related art describes a vehicle system for displaying switching of a driving state between autonomous driving and cooperative driving to a driver. The vehicle system displays an operation amount related to a driving operation of the driver and an operation amount threshold for switching the driving state on an indicator.

SUMMARY

The present disclosure describes a display apparatus mounted on a vehicle comprising a display device placed in a vehicle configured to perform a cooperative driving mode, an acquisition section configured to acquire a degree of restriction applied to an autonomous operation torque, and a display control device that causes the display device to display a cooperative ratio.

BRIEF DESCRIPTION OF DRAWINGS

Objects, features and advantages of the present disclosure will become more apparent from the following detailed description made with reference to the accompanying drawings. In the drawings:

FIG. 4 is a table showing a correspondence between a driving mode and a display mode in the display device;

DETAILED DESCRIPTION

Figure 1:
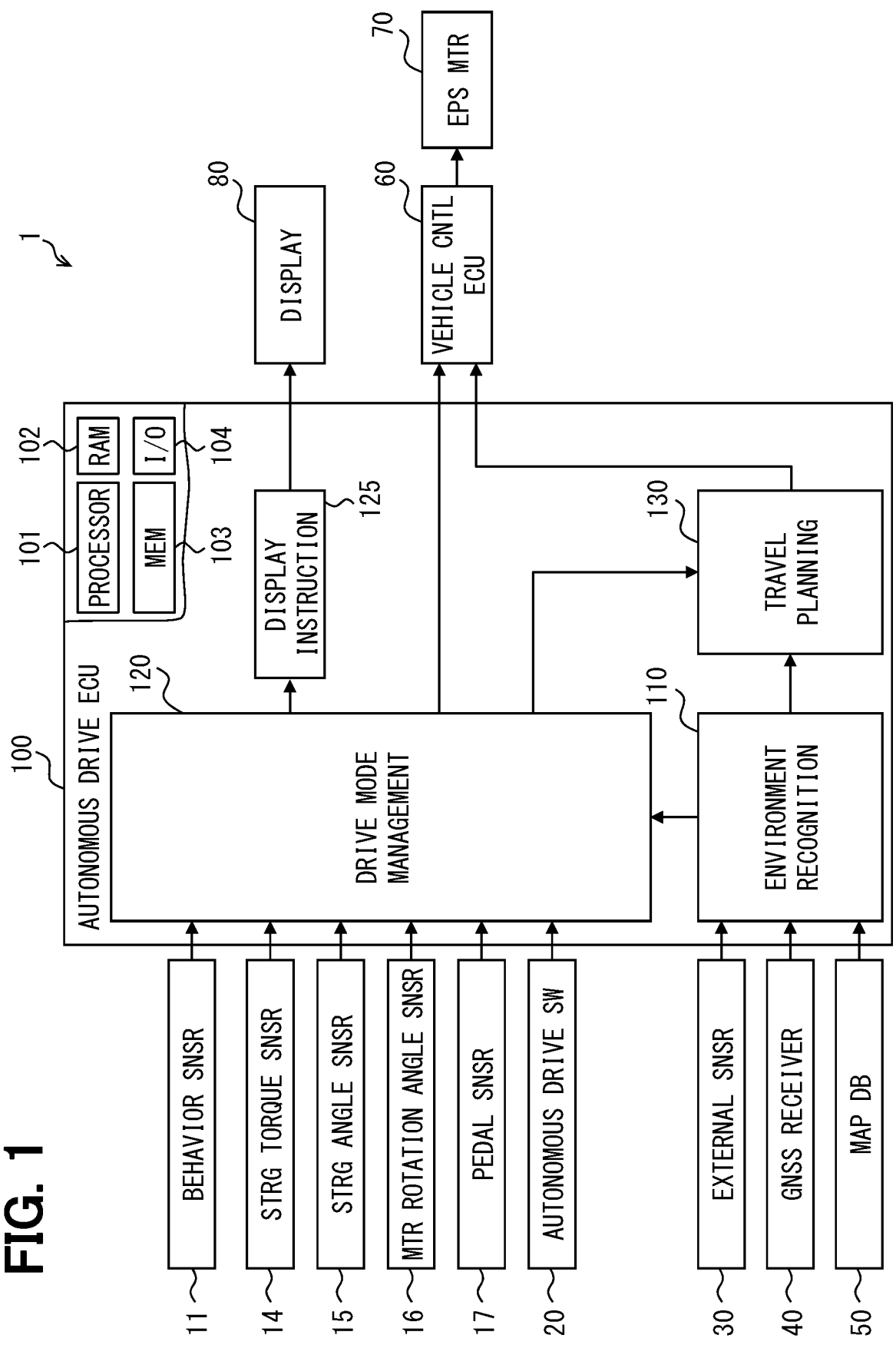
FIG. 1 is a block diagram showing an overall image of an in-vehicle system including a display apparatus according to a first embodiment.

In a vehicle system of a related art, what is displayed to the driver may be only the operation amount of the driver's driving operation. Only displaying the operation amount of the driver's driving operation may be insufficient to allow the driver to grasp a cooperative ratio between the manual driving and the autonomous driving in the cooperative operation.

The present disclosure describes a display apparatus and a display control apparatus for displaying a cooperative ratio between a manual driving and an autonomous driving in a cooperative driving so as to be grasped.

According to one aspect of the present disclosure, a display apparatus mounted on a vehicle may comprise: a display device that is placed in a vehicle compartment of a vehicle configured to perform a cooperative driving mode in which a manual operation by a driver and an autonomous operation by an autonomous driving function cooperate with each other to control a driving of the vehicle; an acquisition section that is configured to acquire a degree of restriction applied to an autonomous operation torque controlled by the autonomous driving function in the cooperative driving mode in response to set of the degree of restriction according to a manual operation amount input by the driver; and a display control device that causes the display device to display a cooperative ratio of the manual operation and the autonomous operation in the cooperative driving mode based on the degree of restriction.

According to another aspect of the present disclosure, a display control apparatus that controls display of a display device mounted on a vehicle that is configured to perform a cooperative driving mode in which a manual operation by a driver and an autonomous operation by an autonomous driving function cooperate with each other to control a driving of the vehicle is provided. The display control apparatus may comprise: an acquisition section that is configured to acquire a degree of restriction applied to an autonomous operation torque controlled by the autonomous driving function in the cooperative driving mode in response to set of the degree of restriction according to a manual operation amount input by the driver; and a display control device that causes the display device to display a cooperative ratio of the manual operation and the autonomous operation in the cooperative driving mode based on the degree of restriction.

According to the present disclosure, the cooperative ratio between the manual operation and the autonomous operation is displayed on a display device based on the degree of restriction applied to the autonomous operation torque in the cooperative driving mode. Therefore, the cooperative ratio in the cooperative driving mode can be displayed. As described above, a display apparatus and a display control apparatus can be provided which display the cooperative ratio between the manual driving and the autonomous driving in the cooperative driving so as to be grasped.

First Embodiment

A display apparatus 1 according to a first embodiment will be described with reference to FIGS. 1 to 6. The display apparatus 1 is mounted on a vehicle having an autonomous driving function capable of performing driving operations such as acceleration, braking, and steering by a driver. The display apparatus 1 according to the first embodiment performs a cooperative ratio display for displaying a cooperative ratio between a manual steering and an autonomous steering to the driver in the cooperative driving in which the manual steering by the driver and the autonomous steering by the autonomous driving function are performed in a cooperative manner. The cooperative ratio may be referred to as an operation load ratio between the manual steering and the autonomous steering. The display apparatus 1 includes an autonomous drive ECU 100 and a display device 80.

The autonomous drive ECU 100 is electrically connected directly or indirectly to a behavior sensor 11, an operation state sensor, an autonomous drive switch 20, an external sensor 30, a GNSS receiver 40, a map database 50, a vehicle control ECU 60, and the display device 80. The map database 50 may be referred to as a DB 50.

The behavior sensor 11 includes multiple sensors for detecting physical state quantities relating to the behavior of the vehicle. For example, the behavior sensor 11 includes a vehicle speed sensor for detecting a traveling speed of the vehicle, an acceleration sensor for detecting the acceleration of the vehicle, and a yaw rate sensor for detecting a yaw rate of the vehicle.

The operation state sensor includes multiple sensors for detecting an operation state of the vehicle. The operation state sensor includes a steering torque sensor 14, a steering angle sensor 15, a motor rotation angle sensor 16, and a pedal sensor 17.

The steering torque sensor 14 is a sensor that detects a steering torque, which is an applied torque applied to a steering shaft. The steering torque sensor 14 detects a torque applied to a torsion bar as the steering torque based on a torsion angle of the torsion bar provided on the steering shaft, for example. The steering angle sensor 15 is a sensor for detecting a steering angle, and is installed, for example, in a steering column including the steering shaft. The motor rotation angle sensor 16 is a sensor for detecting a rotation angle of an EPS (Electric Power Steering) motor 70.

The autonomous drive switch 20 is a switch for switching between an operation (ON) state and a stop (OFF) state of the autonomous driving function. The autonomous drive switch 20 is provided in a spoke portion of a steering wheel or the like.

The external sensor 30 is a sensor for monitoring a surrounding environment of the vehicle. The external sensor 30 detects moving objects, such as pedestrians and other vehicles around the vehicle in question (also referred to as a subject vehicle), as well as stationary objects, such as curbs, traffic signs, road markings, and lane markings on the road. The external sensor 30 may be provided, for example, by a front camera, a LIDAR, a millimeter wave radar, a sonar, or combinations of those components.

The GNSS receiver 40 successively detects the current position of the GNSS receiver by receiving navigation signals transmitted from a positioning satellite configuring a GNSS.

The map DB 50 is mainly formed of a non-volatile memory, and stores high-precision map data (referred to as high accuracy map data) that is maintained for autonomous driving. The high accuracy map data includes three-dimensional shape information of roads including intersections, lane number information, information indicating a traveling direction permitted for each lane, and laying information of crosswalks, bicycle lanes, and the like. The map DB 50 provides the high accuracy map data around the vehicle to the autonomous drive ECU 100 based on a request from the autonomous drive ECU 100.

The vehicle control ECU 60 is electrically connected directly or indirectly to an in-vehicle actuator group. The in-vehicle actuator group performs control such as acceleration, braking, and steering of the vehicle. The in-vehicle actuator group includes, for example, a motor for driving a motor generator for driving and regeneration, a brake actuator, an EPS motor 70, and the like.

The vehicle control ECU 60 is an in-vehicle computer (also referred to as an onboard computer) mainly including a processor, a RAM, a memory device, and a control circuit having an input/output interface. The vehicle control ECU 60 acquires control commands such as acceleration, braking, and steering of the vehicle from the autonomous drive ECU 100. The vehicle control ECU 60 operates the in-vehicle actuator group based on the acquired control command to control the behavior of the vehicle.

For example, the vehicle control ECU 60 calculates a current command value (referred to as a total torque command value) for causing the EPS motor 70 to generate a total torque obtained by adding an assist torque and an autonomous steering torque for a steering control of the vehicle, and outputs the calculated current command value (referred to as a total torque command value) to the EPS motor 70. In this example, the assist torque command value is a current command value for generating an assist torque for assisting the steering operation of the driver so that a transmission feeling corresponding to a road surface reaction force (road surface load) and a feel corresponding to a steering state are realized. An autonomous steering torque command value is a current command value for generating an autonomous steering torque necessary for steering by the autonomous driving function.

Figure 2:
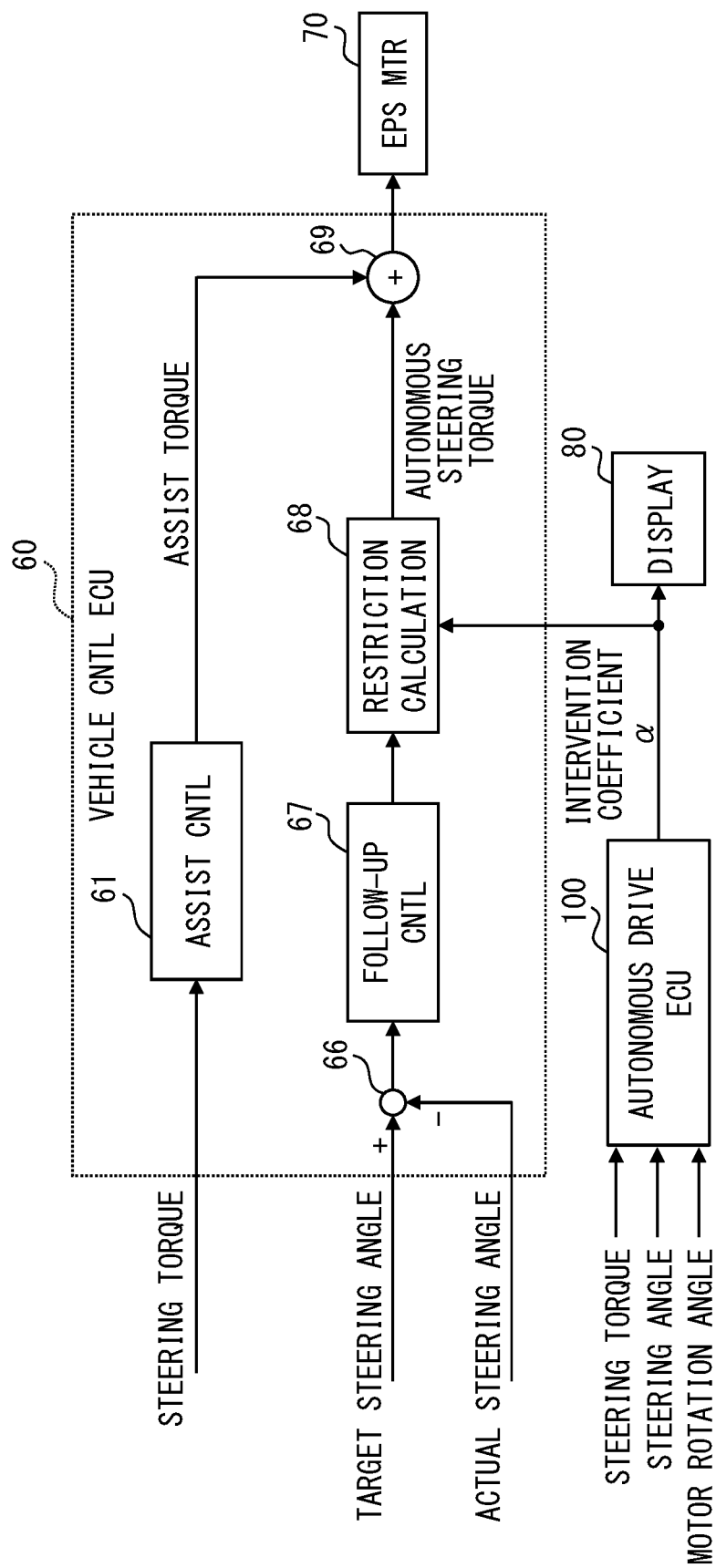
FIG. 2 is a block diagram illustrating a calculation processing of a steering torque according to the first embodiment.

The vehicle control ECU 60 executes a total torque calculation program stored in the memory device by accessing the RAM of the processor, thereby implementing multiple functional devices for calculating the total torque. As shown in FIG. 2, the multiple functional devices include an assist control section 61, a subtraction section 66, a follow-up control section 67, a restriction calculation section 68, and an addition section 69.

The assist control section 61 first calculates a basic assist amount for obtaining the transmission feeling according to the road surface reaction force based on a steering torque Ts and a vehicle speed. In addition, the assist control section 61 calculates an assist compensation amount corresponding to the steering state based on the steering torque Ts and the motor rotation angular velocity. The assist control section 61 generates an assist torque command value by adding a gain corresponding to the vehicle speed and multiplied by the assist compensation amount to the basic assist amount. The assist control section 61 outputs the generated assist torque command value to the addition section 69.

The subtraction section 66 acquires a target steering angle from the travel planning section 130, and acquires an actual steering angle from the steering angle sensor 15. The subtraction section 66 calculates a deviation between the target steering angle and the actual steering angle (referred to as a steering angle deviation), and outputs the deviation to the follow-up control section 67.

The follow-up control section 67 calculates a follow-up torque command value necessary for following up the target steering angle based on the input steering angle deviation. The follow-up control section 67 calculates a follow-up torque command value under a feedback control such as a PID control.

The restriction calculation section 68 performs a restriction calculation for imposing a restriction on the follow-up torque command value calculated by the follow-up control section 67. The restriction calculation section 68 sets an upper limit value of the follow-up torque command value to restrict the follow-up torque command value. The restriction calculation section 68 calculates the follow-up torque command value as the autonomous steering torque command value when the follow-up torque command value is lower than the upper limit value, and calculates the upper limit value as the autonomous steering torque command value when the follow-up torque command value is higher than the upper limit value. For example, the restriction calculation section 68 calculates the upper limit value described above by multiplying a preset threshold by an intervention coefficient $\alpha$. The restriction calculation section 68 outputs the calculated autonomous steering torque command value to the addition section 69.

The addition section 69 calculates the total torque command value by adding the assist torque command value calculated by the assist control section 61 and the autonomous steering torque command value calculated by the restriction calculation section 68. The addition section 69 outputs the total torque command value to the EPS motor 70.

The EPS motor 70 is a steering actuator that controls the behavior of the vehicle by adjusting a steering force and a steering holding force to be applied to a steering mechanism. The EPS motor 70 is attached to the steering mechanism such as a steering column, a pinion, and a rack, and generates a total torque.

Figure 3:
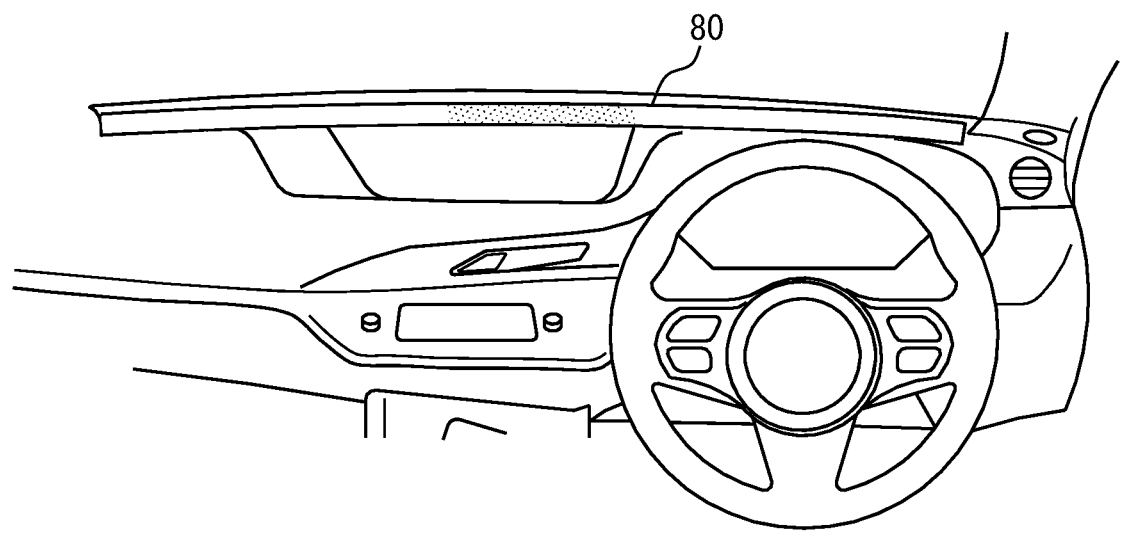
FIG. 3 is a schematic diagram showing a display device mounted on a vehicle.

The display device 80 is configured to display a cooperative ratio between an autonomous driving and a manual driving to the driver based on intervention information. The display device 80 is configured to include multiple light emitting devices such as LEDs, and displays a light emitting portion as a display object. The display device 80 displays a magnitude of the cooperative ratio as an area of the light emitting portion occupying the display region. The display device 80 is provided on an upper surface of a dashboard of the vehicle, for example, as shown in FIG. 3, and exhibits the display region in a line shape extending in a vehicle width direction. In the first embodiment, the display device 80 performs a cooperative ratio display by increasing the light emitting area more as the cooperative ratio increases more.

The autonomous drive ECU 100 shown in FIG. 1 is an in-vehicle computer that controls an autonomous driving function of the vehicle. The autonomous drive ECU 100 mainly includes a control circuit having a processor 101, a RAM 102, a memory device 103, and an input/output interface 104. The processor accesses the RAM 102 to execute various processes for realizing the functions of the respective functional devices. The memory device 103 includes a non-volatile storage medium, and stores various programs to be executed by the processor.

The autonomous drive ECU 100 executes a program stored in the memory device 103 by the processor to implement an environment recognition section 110, the travel planning section 130, and a driving mode management section 120 as functional devices.

The environment recognition section 110 recognizes the traveling environment of the vehicle by combining the detected information of the external sensor 30, the current position information of the GNSS receiver 40, and map information of the map DB 50. As an example, the environment recognition section 110 recognizes the position, shape, and movement state of an object around the vehicle in question, and generates a virtual space in which an actual traveling environment is reproduced. The environment recognition section 110 outputs the information related on the recognized traveling environment to the driving mode management section 120 and the travel planning section 130.

The travel planning section 130 generates a travel plan for causing the vehicle to travel by the autonomous driving function based on the driving mode information from the driving mode management section 120, an ambient environment information from the environment recognition section 110, and the like. For example, the travel planning section 130 generates a recommended route for directing the vehicle to a destination as a medium- to long-term travel plan. In addition, the travel planning section 130 generates control commands such as steering for changing lanes and turning right and left, acceleration and deceleration for speed adjustment, and steering and braking for avoiding obstacles, as a short-term travel plan for performing a travel in accordance with the medium- to long-term travel plan. The travel planning section 130 sequentially outputs the generated travel plans to the vehicle control ECU 60.

The driving mode management section 120 selects a driving mode to be executed by the vehicle from the multiple preset driving modes based on the detection information from the various sensors, the operation information from the autonomous drive switch 20, the travel environment information from the environment recognition section 110, and the like. By way of example, the multiple driving modes include a manual driving mode, an autonomous driving mode, and a cooperative driving mode.

The manual driving mode is a driving mode in which the autonomous driving function is stopped and the manual driving is performed by the driving operation of the driver. The autonomous driving mode is a driving mode in which autonomous driving is performed by executing the autonomous driving function without depending on the driving operation of the driver. The cooperative driving mode is a driving mode in which the driving control by the autonomous driving function and the driving operation by the driver cooperate with each other by permitting the intervention by the driving operation of the driver while executing the driving control by the autonomous driving function.

The driving mode management section 120 performs the switching of the driving mode to another based on the input torque to a steering wheel by the driver. For example, the driving mode management section 120 estimates the input torque by a method to be described later, and switches to the cooperative driving mode when the input torque exceeds a first threshold in the autonomous driving mode. When the input torque exceeds a second threshold value larger than the first threshold in the cooperative driving mode, the driving mode management section 120 switches to the manual driving mode. The driving mode management section 120 outputs the driving mode information relating to the current driving mode of the vehicle to the travel planning section 130.

The driving mode management section 120 calculates a driver input torque Th and uses the driver input torque Th to select the driving mode. In addition, the driving mode management section 120 calculates the cooperative ratio between the autonomous driving function and the driver in the cooperative driving mode as the intervention coefficient $\alpha$ based on the calculated driver input torque Th, and outputs the calculated intervention coefficient $\alpha$ to a display instruction device 125 and the vehicle control ECU 60.

A method of estimating the driver input torque Th by the driving mode management section 120 will be described. When it is assumed that a steering angle value is $\theta h$ and a detected value of the steering torque detected by the steering torque sensor 14 is Ts, the driver input torque Th is calculated by the following Expression (1) based on the concept of a disturbance observer.

[Expression 1]

$$T_h = \frac{1}{\tau_t s + 1}(I\ddot{\theta}_h + C\dot{\theta}_h + T_s) \quad \text{Equation (1)}$$

In Expression (1), I is a moment of inertia around the steering wheel, C is a viscous friction coefficient around the steering wheel, and K is a rigidity of the torsion bar. Those values are parameters indicating the physical characteristics of the vehicle, and are values stored in advance in a memory device or the like. In addition, τt is a time constant.

In order to accurately estimate the driver input torque Th separately from the torque generated in the steering rotation shaft by the tire reaction force, there is a need to improve the detection accuracy of a steering angle. Therefore, the driving mode management section 120 calculates an estimated value θh^ of the steering angle by use of a detected value θhd of the steering angle detected by the steering angle sensor 15 and a detected value θm of the motor rotation angle detected by the motor rotation angle sensor 16. More specifically, the driving mode management section 120 calculates the estimated value θh^ based on the following Expression (2) using a complementary filter.

[Expression 2]

$$\hat{\theta_h} = \frac{1}{\tau_\theta s + 1}\theta_{hd} + \frac{s}{\tau_\theta s + 1}\left(\theta_m + \frac{T_s}{K}\right) \quad \text{Equation (2)}$$

According to a first term on a right side of Expression (2), the driving mode management section 120 calculates a value obtained by passing the detected value θhd of the steering angle sensor 15 through a low-pass filter. As a result, the driving mode management section 120 leverages only a low-frequency component having relatively high reliability with respect to the detected value θhd of the steering angle sensor 15, which is generally lower in resolution than the motor rotation angle sensor 16.

According to a second term on the right side of Expression (2), the driving mode management section 120 calculates a value obtained by adding the torsion angle of the torsion bar (calculated from the steering torque Ts and the torsion bar rigidity K) to the detected value θm of the motor rotation angle through a high-pass filter. Although the steering angle equivalent value has a high resolution, a steady error may occur. The driving mode management section 120 passes the steering angle equivalent value through the high-pass filter, whereby the driving mode management section 120 leverages only the high-frequency component having relatively high reliability with respect to the steering angle equivalent value.

The driving mode management section 120 leverages the estimated value θh^ of the steering angle calculated based on Expression (2) as a steering angle value θh in Expression (1). As a result, the driving mode management section 120 can improve an accuracy of the driver input torque Th as compared with the case where the detected value θhd of the steering angle sensor 15 is used as it is as the steering angle value θh.

The driving mode management section 120 calculates the intervention coefficient α based on the driver input torque Th. The intervention coefficient α is the degree of restriction for restricting the autonomous steering torque which exhibits the autonomous driving function according to the driver input torque Th. The intervention coefficient α is in a predefined correlation with the driver input torque Th. The intervention coefficient α is a value that decreases more as the driver input torque Th increases more, and changes nonlinearly with respect to the driver input torque Th, for example. The above correlation is stored in advance in the memory device as data of a map, a table, a function, and the like. The driving mode management section 120 refers to the stored correlation data and acquires the value of the intervention coefficient α corresponding to the calculated driver input torque Th. In other words, the driving mode management section 120 has a function of an acquisition section that acquires the intervention coefficient α as the degree of restriction for restricting the autonomous steering torque. The driving mode management section 120 outputs the acquired value of the interventional coefficient α to the display instruction device 125 and the vehicle control ECU 60. The intervention coefficient α may define a different correlation with respect to the driver input torque Th at the time of turning-in and at the time of turning-out of the steering wheel.

The display instruction device 125 determines the display mode of the display device 80 based on the intervention coefficient α and the driving mode information acquired from the driving mode management section 120, and outputs a display instruction to the display device 80. Specifically, the display instruction device 125 changes an emission color of the display region according to the driving mode, and causes the display region to emit a light with a light emitting area corresponding to the magnitude of the intervention coefficient α. The display instruction device 125 is an example of the display control device.

In this example, since the intervention coefficient α is a value defining the upper limit value of the autonomous steering torque that can be output as described above, the display instruction device 125 causes the display device 80 to display an absolute amount of the autonomous steering torque that can potentially be output. In other words, even when the magnitude of the actually output autonomous steering torque does not change, the display instruction device 125 can change the light emitting area of the display device 80.

An example of a change in the display mode of the display device 80 according to the driving mode will be described with reference to a table of FIG. 4. In the case of the manual driving mode, the entire display region of the display device 80 is in an off state, which presents the manual driving state in which the autonomous driving function is off. In the case of the autonomous driving mode, the entire display region is in a light emitting state, which represents the autonomous driving state in which the behavior of the vehicle is controlled without the intervention of the driving operation by the driver.

In the case of the cooperative driving mode, a light emission color is changed to a display color different from that in the autonomous driving mode. As the intervention coefficient α is larger, the larger light emitting area is displayed with light emission. This presents the fact that the driving mode is the cooperative driving mode and the current cooperative ratio of the autonomous driving and the manual driving. As the intervention coefficient α increases more, the light emitting area expands more from the vicinity of the center of the display region in the vehicle width direction to both sides in the vehicle width direction. A boundary between the light emitting portion and the light-off portion is displayed in a gradation shape in which a light emission luminance gradually decreases toward the light-off portion.

As described above, for example, when the driver steers the steering wheel during the autonomous driving, the light emitting portion changes so as to decrease from the entire display region toward the center of the display region. In addition, when the driver releases his/her hand from the steering wheel and stops steering during the cooperative driving, the light emitting portion changes so as to spread from a state in which the light emitting portion is reduced to the center of the display region to both sides. The display device 80 may change the display color between the case in which the intervention coefficient α is reduced and the light emitting portion is reduced and the case in which the intervention coefficient α increases and the light emitting portion is enlarged.

Figure 5:
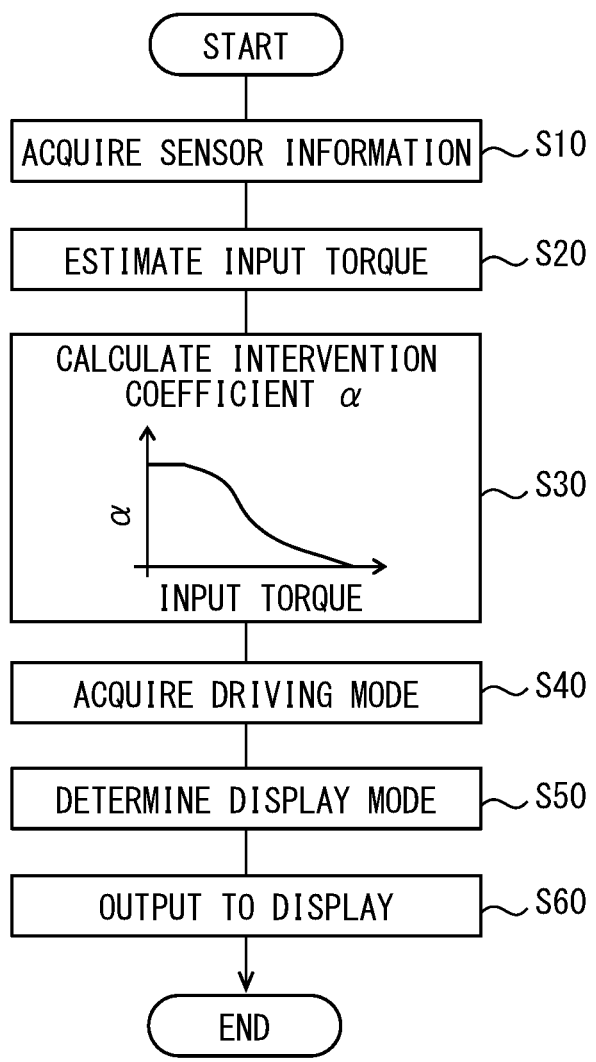
FIG. 5 is a flowchart showing an example of a display process according to the first embodiment.

Referring to a flowchart of FIG. 5, the process to be executed in the autonomous drive ECU 100 for displaying the cooperative ratio described above will be described. The autonomous drive ECU 100 first acquires sensor information in Step S10, and the process proceeds to Step S20. In Step S20, the input torque is estimated, and the process proceeds to Step S20. In Step S30, the intervention coefficient α is calculated based on a correspondence relationship between the input torque and the intervention coefficient α stored in advance, and the process proceeds to Step S40.

In Step S40, the current driving mode is acquired, and the process proceeds to Step S50. In Step S50, a display mode on the display device 80, that is, the display color and a size of the light emitting portion are determined based on the current driving mode and the intervention coefficient α. When the process of Step S50 is executed, the process proceeds to Step S60, and after a display command for realizing the determined display mode is output to the display device 80, a series of processes are terminated.

The configuration and operation and effects of the display apparatus 1 according to the first embodiment will be described.

The display apparatus 1 includes the display device 80 provided in the vehicle compartment of the vehicle, and the driving mode management section 120 for acquiring the intervention coefficient α, which is the degree of restriction of the autonomous steering torque, which is set for the autonomous operation torque output by the autonomous driving function according to the manual operation amount input by the driver. The display apparatus 1 further includes the display instruction device 125 that causes the intervention coefficient α to be displayed on the display device 80 as the cooperative ratio between the manual operation and the autonomous operation in the cooperative driving mode.

According to the above configuration, the display apparatus 1 displays the intervention coefficient α as the cooperative ratio in the cooperative driving mode on the display device 80. Accordingly, the display apparatus 1 can be provided which displays the cooperative ratio between the manual driving and the autonomous driving in the cooperative driving mode so as to be graspable. This also enables the display apparatus 1 to display the extent to which the autonomous operation torque exhibiting the autonomous driving function corresponding to the driving operation of the driver can be output in a limited state. Therefore, the driver can more accurately grasp the cooperative ratio.

The display device 80 displays the cooperative ratio by changing the area of the light emitting portion occupied in the display region in accordance with a change in the intervention coefficient α. This allows the display device 80 to provide a more intuitive cooperative ratio indication.

Since the display device 80 according to the first embodiment is provided on the upper surface of the dashboard and displays the magnitude of the cooperative ratio by the light emitting portion extending to both sides in the vehicle width direction, the cooperative ratio can be displayed at a position close to a front windshield. For that reason, the display apparatus 1 can display the cooperative ratio in which the need for the driver to remove the sight line from the foreground is reduced.

The display device 80 changes the display color of the cooperative ratio between the cooperative driving mode and the other driving modes. According to the above configuration, the display device 80 can display the current driving mode in the same region as the display region of the cooperative ratio. Therefore, the display apparatus 1 can more intuitively present the driver with the information obtained by combining the cooperative ratio and the current driving mode.

The driving mode management section 120 estimates the driver input torque Th from the detected value of the steering torque, the steering angle, and the rotation angle of the EPS motor 70. Since the driving mode management section 120 calculates the intervention coefficient α based on the estimated value, the driving mode management section 120 can acquire the driver input torque Th more accurately than that in the case where the detected value is used as the driver input torque. The display apparatus 1 displays the intervention coefficient α reflecting the above estimated value as the cooperative ratio, as a result of which the degree of intervention in the autonomous steering of the manual steering can be more accurately reflected in the display content.

The driving mode management section 120 calculates a value defining the upper limit value of the autonomous steering torque that can be output from the autonomous driving function as the intervention coefficient α, and outputs the calculated value to the display device 80. This allows the display apparatus 1 to display the absolute amount of autonomous steering torque that can potentially be output. For that reason, even when a difference between the steering intention of the autonomous driving function and the steering intention of the driver is small and the actually output autonomous steering torque does not substantially change, the display apparatus 1 can change the magnitude of the displayed cooperative ratio in accordance with a change in the driver input torque Th. Therefore, the display apparatus 1 can display to the driver that the driver's steering intention is reliably transmitted to the vehicle. As described above, the display apparatus 1 can display that the driver has the sovereignty of the vehicle operation, and can enhance the psychological sense of security of the driver.

Second Embodiment

Figure 6:
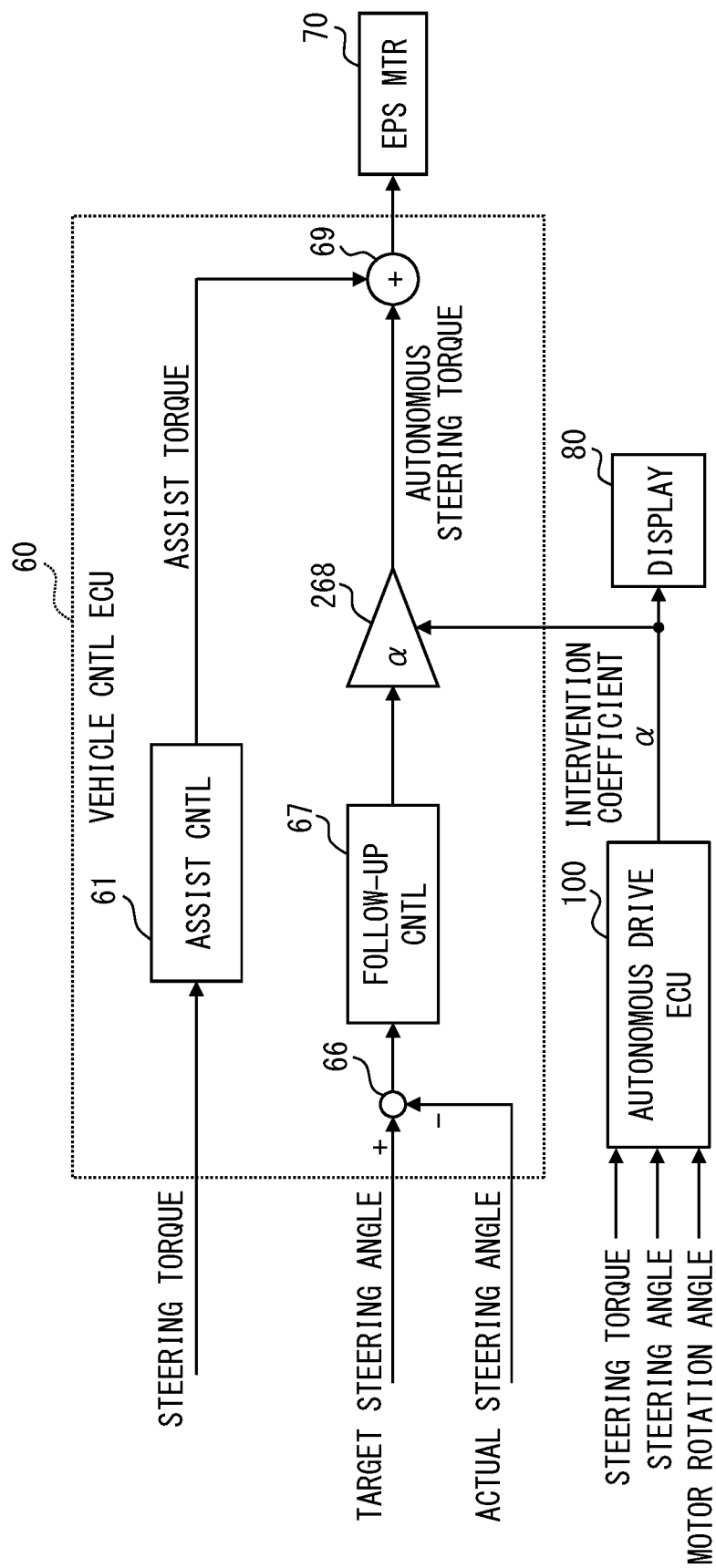
FIG. 6 is a block diagram illustrating a calculation processing of a steering torque according to a second embodiment.

In a second embodiment, a modification of the display apparatus 1 according to the first embodiment will be described. In FIG. 6, components denoted by the same reference numerals as those in the drawings of the first embodiment are similar components and exhibit the same operation and effects.

A display apparatus 1 according to the second embodiment is different from the first embodiment in a calculation method of an autonomous steering torque.

A vehicle control ECU 60 according to the second embodiment includes a coefficient multiplication section 268 instead of the restriction calculation section 68 according to the first embodiment. The coefficient multiplication section 268 directly multiplies the acquired intervention coefficient α by a follow-up torque command value, and outputs the calculation result as an autonomous steering torque. In other words, the coefficient multiplication section 268 sets a reduction ratio of a value of the autonomous steering torque to a follow-up torque, to thereby restrict an output of the autonomous steering torque.

As described above, the output autonomous steering torque has a value that changes more sensitively with respect to a change in the intervention coefficient α as compared with the first embodiment. In other words, the intervention coefficient α in the second embodiment is a value corresponding to the magnitude itself of the autonomous steering torque to be exerted. Since the display device 80 according to the second embodiment displays the cooperative ratio based on the intervention coefficient α, the cooperative ratio display corresponding to the change in the magnitude of the autonomous steering torque actually felt by the driver can be executed.

Third Embodiment

Figure 7:
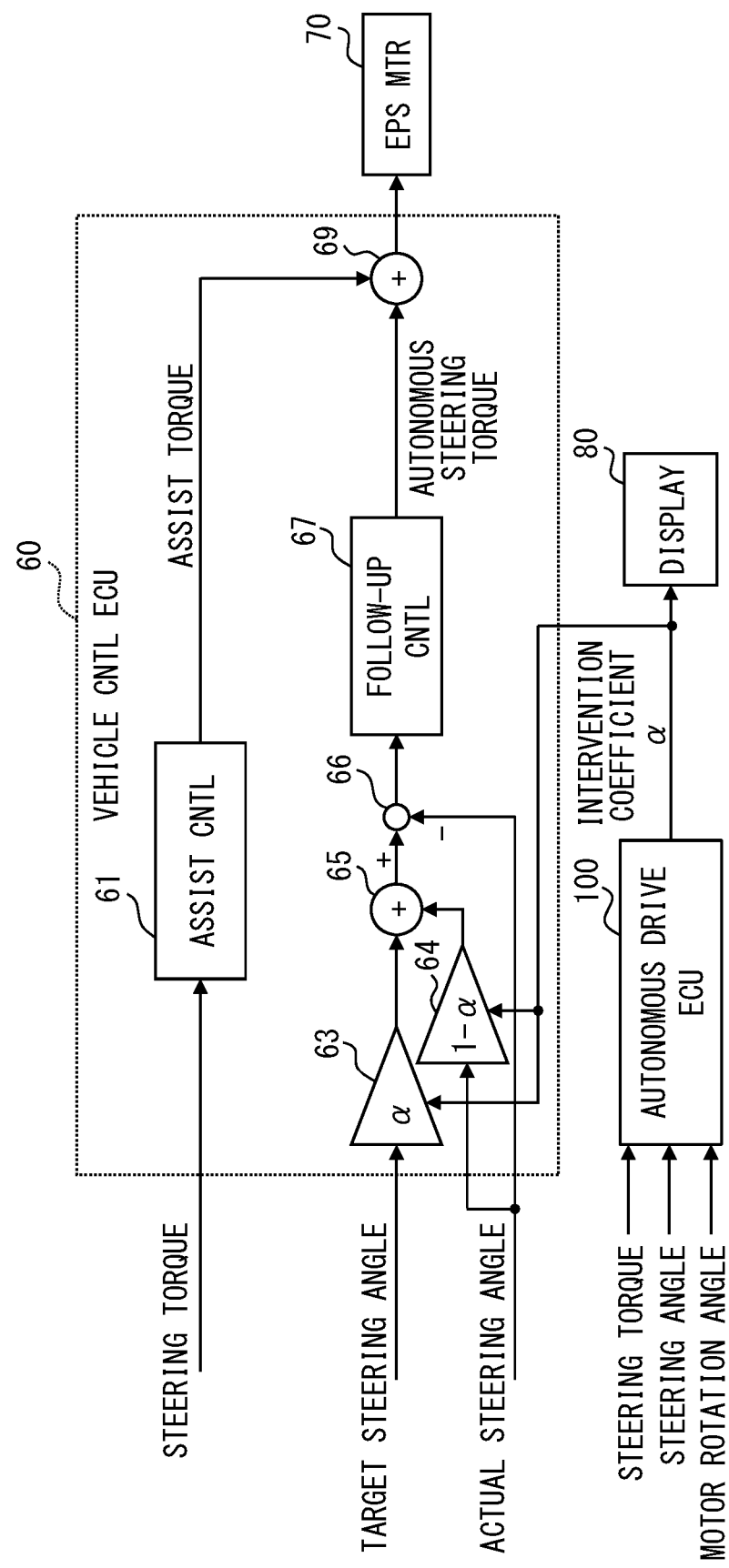
FIG. 7 is a block diagram illustrating a calculation processing of a steering torque according to a third embodiment.

In a third embodiment, a modification of the display apparatus 1 according to the first embodiment will be described. In FIG. 7, components denoted by the same reference numerals as those in the drawings of the first embodiment are similar components and exhibit the same operation and effects.

A vehicle control ECU 60 according to the third embodiment includes a first multiplication section 63, a second multiplication section 64, and a limit value addition section 65 instead of the restriction calculation section 68.

The first multiplication section 63 acquires a target steering angle, and multiplies the target steering angle by an intervention coefficient α. The first multiplication section 63 outputs the calculated value to the limit value addition section 65. The second multiplication section 64 acquires an actual steering angle, and multiplies the actual steering angle by "1-α". The second multiplication section 64 outputs the calculated value to the limit value addition section 65.

The limit value addition section 65 adds the outputs from the first multiplication section 63 and the second multiplication section 64 together, and outputs the result to a subtraction section 66. Therefore, the subtraction section 66 according to the second embodiment calculates a deviation between the value output from the limit value addition section 65 and the actual steering angle.

In the third embodiment, when the intervention coefficient α is 0, the target steering angle and the actual steering angle are equal to each other. In that case, the deviation becomes 0 in the subtraction section 66, and the resultant output autonomous steering torque becomes 0. In that case, when the driver releases his/her hand from a steering wheel and gradually increases the intervention coefficient α, the target steering angle gradually shifts from a magnitude equivalent to the actual steering angle to a magnitude of the original target steering angle. Therefore, compared with the embodiments described above, the autonomous steering tends to return slowly.

Other Embodiments

The present disclosure in the present specification is not limited to the illustrated embodiments. The present disclosure encompasses the illustrated embodiments and modifications based on the embodiments by those skilled in the art. For example, the present disclosure is not limited to the combinations of components and/or elements shown in the embodiments. The present disclosure may be implemented in various combinations. The present disclosure may have additional portions that may be added to the embodiments. The present disclosure encompasses omission of components and/or elements of the embodiments. The present disclosure encompasses the replacement or combination of components and/or elements between one embodiment and another. The disclosed technical scope is not limited to the description of the embodiments.

In the embodiment described above, the display control of the display device 80 is executed by the autonomous drive ECU 100. Alternatively, another in-vehicle ECU may be configured to acquire intervention information transmitted from the autonomous drive ECU 100, and to execute a display control of the display device based on the intervention information.

Figure 8:
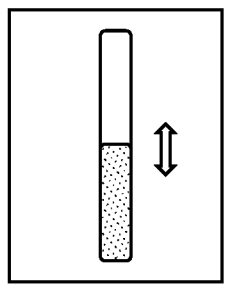
FIG. 8 is a schematic diagram showing a display mode of a display device according to another embodiment.

In the embodiments described above, the display device 80 displays the cooperative ratio in the display region extending from the center to the right and left in the vehicle width direction. Alternatively, the display device 80 may display the cooperative ratio in other display modes. For example, as shown in FIG. 8, the display device may be displayed by a display region extending in the vertical direction. In addition, the display device may display the magnitude of the cooperative ratio by a size of a region extending from one end of the display region to the other end.

Figure 9:
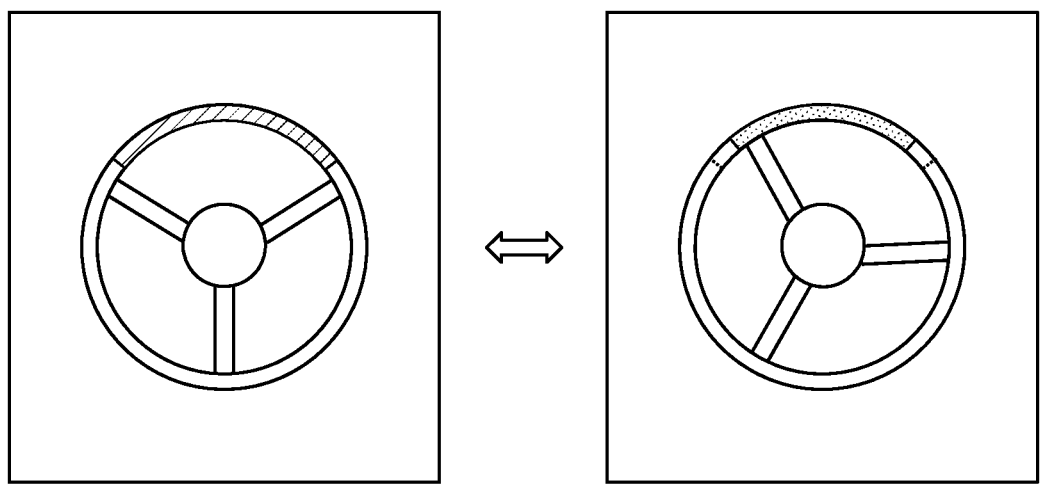
FIG. 9 is a schematic diagram showing a display mode of a display device according to another embodiment.
Figure 10:
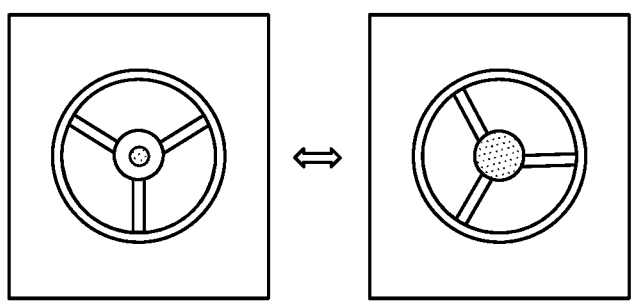
FIG. 10 is a schematic diagram showing a display mode of a display device according to another embodiment.

The display device may be provided on a steering wheel, as shown in FIG. 9 or FIG. 10. In the case of the embodiment shown in FIG. 9, the display device is provided on a rim portion of the steering wheel. The display device is provided over the entire circumference of the rim portion. The display device moves a light emitting portion in accordance with the rotation of the steering wheel so as to cause an upper portion of the rim portion to always emit a light in the light emitting display. In other words, the display device moves the light emitting portion by the same rotation angle in a direction opposite to the rotation direction of the steering wheel. In the present embodiment, the display device displays a change in the cooperative ratio by a change in a light emitting area and a change in a display color. Specifically, the display device displays a change in the cooperative ratio in the cooperative driving mode by a change in a circumferential length of the light emitting portion. In an example shown in FIG. 9, when the driver operates the steering wheel, the display color is changed by switching from the autonomous driving mode to the cooperative driving mode, and the light emitting portion is shortened so as to decrease from both ends toward the uppermost point of the rim portion by increasing the degree of intervention of the manual steering. In an embodiment shown in FIG. 10, the display device is provided on a hub portion of the steering wheel. In the present embodiment, the display device displays a change in the cooperative ratio by a size of the display area extending from the center in a circular shape.

Figure 11:
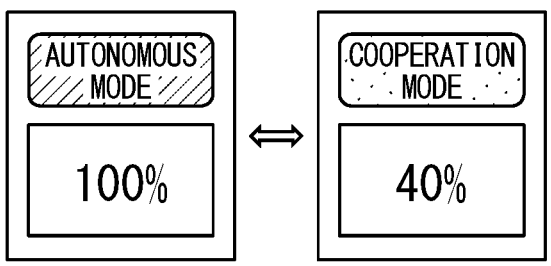
FIG. 11 is a schematic diagram showing a display mode of a display device according to another embodiment.

The display device may digitally display the cooperative ratio by numerical values, as shown in FIG. 11. In an embodiment shown in FIG. 11, the display device displays the cooperative ratio in percentage. In the present embodiment, the display device displays the driving mode in a display region different from the display region of the cooperative ratio.

In the embodiments described above, the display device 80 is configured to include a light emitting device provided on a dashboard of the vehicle. Alternatively, the display device 80 may be provided by a navigation apparatus, a head-up display, a vehicle instrument, or the like.

In the embodiments described above, the display apparatus 1 displays the cooperative ratio between the manual driving and the autonomous driving in the steering operation. Alternatively, the display apparatus 1 may be configured to display the cooperative ratio in other driving operations such as an acceleration operation and a braking operation.

The processor according to the embodiment described above is a processing unit including one or more CPUs (Central Processing Units). In addition to the CPUs, the processor described above may be a processor including a GPU (Graphics Processing Unit), a DFP (Data Flow Processor), and the like. Further, the processor may be a processing unit including an FPGA (Field-Programmable Gate Array), an IP core specialized for a particular processing such as learning and reasoning of AI, and so on. The arithmetic circuit units of the processor described above may be individually mounted on a printed circuit board, or may be mounted on an ASIC (Application Specific Integrated Circuit), an FPGA, or the like.

Various non-transitory tangible storage media (non-transitory tangible storage medium), such as a flash memory and a hard disk, may be employed for the memory device that stores the control program. The form of the storage medium described above may also be changed as appropriate. For example, the storage medium may be in the form of a memory card or the like, and may be inserted into a slot portion provided in the in-vehicle ECU and electrically connected to the control circuit.

The control device and the method described in the present disclosure may be implemented by a special purpose computer configuring a processor programmed to perform one or more functions embodied by a computer program. Alternatively, the device and the method described in the present disclosure may be implemented by a dedicated hardware logic circuit. Alternatively, the device and the method described in the present disclosure may be implemented by one or more dedicated computers configured by a combination of a processor executing a computer program and one or more hardware logic circuits. The computer program may also be stored on a computer-readable non-transitory tangible recording medium as instructions to be executed by a computer.

The EPS motor 70 may correspond to a steering actuator, the autonomous drive ECU 100 may correspond to a display control apparatus, the driving mode management section 120 may correspond to an acquisition section, and the display instruction device 125 may correspond to a display control device.

What is claimed is:

1. A display apparatus mounted on a vehicle comprising:
a display device that is placed in a vehicle compartment of a vehicle configured to perform a cooperative driving mode in which a manual operation by a driver and an autonomous operation by an autonomous driving function cooperate with each other to control a driving of the vehicle;
an acquisition section that is configured to acquire a degree of restriction applied to an autonomous operation torque controlled by the autonomous driving function in the cooperative driving mode in response to setting of the degree of restriction according to a manual operation amount input by the driver; and
a display control device that causes the display device to display a cooperative ratio of the manual operation and the autonomous operation in the cooperative driving mode based on the degree of restriction.

2. The display apparatus according to claim 1, wherein:
the display device changes an area of a display object occupying a display region according to a change in the degree of restriction.

3. The display apparatus according to claim 2, wherein:
the display device changes a display mode of the display region between the cooperative driving mode and another driving mode.

4. The display apparatus according to claim 1, wherein:
the manual operation amount is an estimated value of torque input by the driver, which is estimated based on at least a detected value of torque applied to a steering shaft of a steering wheel; and
the acquisition section acquires the degree of restriction set according to the estimated value.

5. The display apparatus according to claim 4, wherein:
the estimated value is determined based on a steering angle of the steering wheel and a rotation angle of a steering actuator, in addition to the detected value of the applied torque.

6. The display apparatus according to claim 1, wherein:
the acquisition section acquires, as the degree of restriction, a value defining an upper limit value of the autonomous operation torque that is capable of being output by the autonomous driving function.

7. The display apparatus according to claim 1, wherein:
the acquisition section acquires, as the degree of restriction, a value defining the autonomous operation torque output by the autonomous driving function.

8. A display control apparatus that controls display of a display device mounted on a vehicle that is configured to perform a cooperative driving mode in which a manual operation by a driver and an autonomous operation by an autonomous driving function cooperate with each other to control a driving of the vehicle, the display control apparatus comprising:
an acquisition section that is configured to acquire a degree of restriction applied to an autonomous operation torque controlled by the autonomous driving function in the cooperative driving mode in response to setting of the degree of restriction according to a manual operation amount input by the driver; and
a display control device that causes the display device to display a cooperative ratio of the manual operation and the autonomous operation in the cooperative driving mode based on the degree of restriction.

* * * * *